United States Patent [19]
Jennings et al.

[11] Patent Number: 5,712,942
[45] Date of Patent: Jan. 27, 1998

[54] OPTICAL COMMUNICATIONS SYSTEM HAVING DISTRIBUTED INTELLIGENCE

[75] Inventors: Mark R. Jennings, Sussex County; Frank Salvatore Leone, Union County; Richard Joseph Pimpinella, Hunterdon County, all of N.J.

[73] Assignee: Lucent Technologies Inc., Murray Hill, N.J.

[21] Appl. No.: 645,108

[22] Filed: May 13, 1996

[51] Int. Cl.⁶ .................................................. G02B 6/36
[52] U.S. Cl. ................................................ 385/134; 385/24
[58] Field of Search ............................ 385/134, 135, 385/24

[56] References Cited

U.S. PATENT DOCUMENTS

| | | | |
|---|---|---|---|
| 4,861,134 | 8/1989 | Alameel et al. | 350/96.2 |
| 5,107,532 | 4/1992 | Hansen et al. | 379/25 |
| 5,212,761 | 5/1993 | Petrunia | 385/135 |
| 5,265,187 | 11/1993 | Morin et al. | 385/135 |
| 5,283,851 | 2/1994 | Vergnolle | 385/134 |
| 5,285,305 | 2/1994 | Cohen et al. | 359/110 |
| 5,329,392 | 7/1994 | Cohen | 359/124 |
| 5,383,051 | 1/1995 | Delrosso et al. | 385/135 |
| 5,448,675 | 9/1995 | Leone et al. | 385/135 |
| 5,461,693 | 10/1995 | Pimpinella | 385/135 |
| 5,515,200 | 5/1996 | Delrosso et al. | 385/135 |

*Primary Examiner*—John Ngo
*Attorney, Agent, or Firm*—John M. Harman

[57] ABSTRACT

The invention is embodied in a distributed intelligence optical fiber communications system capable of fully automated and continuous monitoring and testing of the optical fibers and their connections within the optical fiber distribution frames therein. In particular, it is an optical communications system having an optical distribution frame including interconnection modules having actively intelligent microcontrollers thereon. Also, the distribution frame includes inventive electrical and optical interconnection fabrics between the distributed intelligence located on the interconnection modules and a host located outside of the distribution frame. The distributed intelligence interconnection modules allow monitoring, testing and/or related activities of the overall optical communications system to be performed locally at the interconnection modules. Also, when used in combination with the electrical and optical interconnection fabrics, the inventive modules substantially reduce optical fiber routing and enable more effective monitoring and testing operations to be performed, while maintaining compatibility with existing conventional cross-connect, switching and network architectures.

17 Claims, 4 Drawing Sheets

OPTICAL COMMUNICATIONS SYSTEM HAVING DISTRIBUTED INTELLIGENCE

BACKGROUND OF THE INVENTION

1. Field of the Invention

The invention relates to optical fiber communications systems. More particularly, the invention relates to the monitoring and maintenance of inter-connected optical fibers within a communications system.

2. Description of the Related Art

In optical fiber communication systems, optical fiber distribution flees or lightguide cross-connect (LGX) frames are used for optical coupling within the communications system, e.g., for coupling optical fibers from an outside environment entering a customer's premises to internal fibers for equipment on the customer's premises. A typical distribution frame houses a multiplicity of shelves, each shelf including one or more optical coupling or interconnection modules in which the ends of incoming fibers and/or outgoing internal optical fibers are adapted for interconnection therebetween by appropriate connectors. For example, the incoming and outgoing optical fibers are connected to respective coupling modules, and a corresponding plurality of optical cross-connect jumper cables (i.e., patch cords) optically connect the incoming optical fibers from one coupling module to the desired outgoing optical fibers from the appropriate coupling module. For example, see generally U.S. Pat. No. 4,630,886 issued to Lauriello et at. Alternatively, the incoming and outgoing fibers are terminated at different locations within the same distribution frame and cross-connect jumpers optically connect the appropriate fibers from one location to another.

Within these optical distribution flames, testing the integrity and quality of the lines and/or connections therebetween often is performed manually, making it a difficult, cumbersome, costly and labor-intensive undertaking. It is known to launch test signals to determine the condition of fibers (e.g., see U.S. Pat. No. 5,329,392 issued to Cohen). However, this determination is performed manually, and typically in reaction to a system malfunction rather than an alert from a continuous monitoring system. Also, it is known to determine the condition of patch connections between coupling modules (e.g., see U.S. Pat. No. 5,461,693 issued to Pimpinella).

In an alternative optical communications system testing arrangement, optical interconnections within a distribution frame are optically routed in series through an external testing or monitoring structure, e.g., one or more additional frames housing shelves of testing and/or monitoring equipment controlled by a single host or controller. In this arrangement, often referred to as a remote fiber testing system (RFTS), each optical interconnection has a first additional optical fiber channel routed to the testing location and a second additional optical fiber channel routed from the testing location. Monitoring typically is performed by sequentially polling the interconnections of each individual fiber, which is especially inefficient and impractical for communications systems having a distribution frame with more than a minimal number of optical interconnections.

For example, in conventional dark (spare) fiber testing operations, each fiber takes longer than at least 60 seconds to test. Therefore, any fiber disruption will not be detected thereby for at least 60 seconds times the number of fibers between the disrupted fiber and the fiber currently being polled. Such results are non-optimum in current optical communications systems.

A more efficient, autonomous, automatic and continuous system of monitoring distribution frames and the optical fibers connected thereto within optical communications systems is sought.

SUMMARY OF THE INVENTION

The invention is embodied in a distributed intelligence optical fiber communications system having automated and continuous monitoring and testing of the optical fibers and their distribution frame connections. In particular, it is an optical communications system having a distribution frame for operably cross-connecting optical channels, in which the distribution frame includes interconnection modules having actively intelligent microcontrollers thereon. Alternatively, the distribution frame also includes inventive electrical and optical interconnect fabrics between the distributed intelligence of the interconnection modules and a system controller. The distributed intelligence interconnection modules allow monitoring, testing and/or related activities of the overall optical communications system to be performed locally at the interconnection modules. Also, when used in combination with the electrical and optical interconnection fabrics, the inventive modules substantially reduce optical fiber routing and enable more effective monitoring and testing operations to be performed, while maintaining compatibility with existing conventional cross-connect, switching and network architectures.

DETAILED DESCRIPTION

Figure 1:
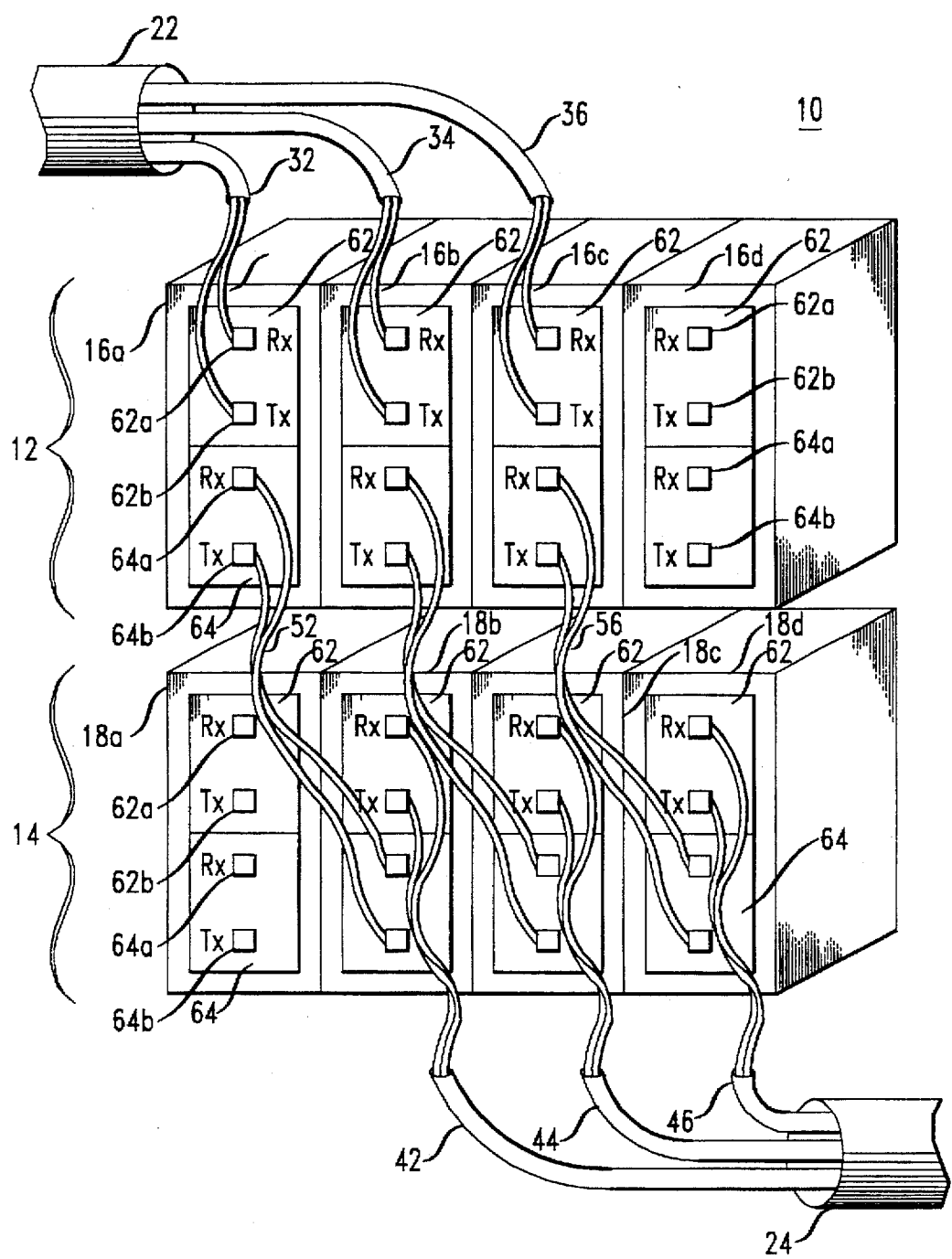
FIG. 1 is a schematic diagram of a conventional distribution frame used in an optical communications system.

In the following description, similar components are referred to by the same reference numeral in order to simplify the sequential aspect of the drawings.

Referring now to FIG. 1, a schematic diagram of an optical fiber distribution frame 10 is shown. Conventional communications systems use such a distribution frame alone or in combination with other distribution frames to provide optical communications throughout an area of interest. Distribution frame 10 includes at least one shelf (e.g., shelves 12 and 14) with one or more interconnection modules installed within available slots on each shelf. For example, interconnection modules 16a, 16b, 16c and 16d are mounted or otherwise operably installed within shelf 12 and interconnection modules 18a, 18b, 18c and 18d are mounted within shelf 14. Although each module shown here and described below occupies a single shelf slot and is capable of handling a single optical channel, it should be remembered that distribution frame 10 also is suitable for use with existing modules that, e.g., occupy two (2) or more shelf slots yet have three (3) or more optical channels.

The interconnection modules are used to optically cross-connect optical channels, e.g., from a first optical cable 22 to a second optical cable 24. As shown in FIG. 1, a plurality of first optical channels 32, 34 and 36, each having a transmit fiber and a receive fiber, are optically connected to interconnection modules 16a, 16b and 16c, respectively. Similarly, a plurality of second optical channels 42, 44 and 46 are optically connected to interconnection modules 18b, 18c and 18d, respectively. Corresponding pairs of jumper fibers or optical cross-connects (shown as 52, 54 and 56) interconnect first optical channels with the desired second optical channels.

Although the interconnection modules being cross-connected are shown installed within adjacent shelves 12, 14, it is known and will be more evident from subsequent discussions herein that the interconnection modules being cross-connected are capable of being located in different physical areas (e.g., different bays) of the same distribution frame, or even different distribution frames within the same optical communications system. The physical distance between cross-connected interconnection modules are limited, e.g., by the practical length of cross-connect jumpers used therebetween.

In a conventional optical communications system arrangement, distribution frame 10 is housed within or in close proximity to a facility of interest, e.g., a customer's premises. In FIG. 1, first optical cable 22 represents, e.g., a plurality of incoming optical channels entering the facility (often referred to as "OSP" or "outside plant" cable). Correspondingly, second optical channel 24 represents a plurality of optical channels for equipment or other uses within the facility (often referred to as "equipment" cable).

In this example, interconnection module 16a in shelf 12 is shown in optical connection with interconnection module 18b in shelf 14 via jumper fiber pair 52. Each interconnection module has a first jack pair 62 (e.g., a receive or Rx jack 62a and a transmit or Tx jack 62b) typically used for connection with an optical channel and a second pair of jacks 64a and 64b, typically for connection with a cross-connect jumper pair, as shown.

Alternatively, a single interconnection module directly couples a first optical channel to a second optical channel. That is, a first optical channel is operably connected to the first jack pair 62 of a desired interconnection module and a second optical channel is operably connected to the second jack pair 64 of the same interconnection module.

Typically, interconnection module jacks are adapted for optically coupling various types of optical fibers. For example, each interconnection module is configured, e.g., so that the Tx jack of one pair is optically coupled to the Rx jack of the other jack pair. In this manner, consistency is maintained throughout distribution frame 10 with respect to the connections that subsequently are made to the interconnection modules.

For example, in FIG. 1, first optical channel 32 has a transmit fiber shown optically connected to Rx jack 62a and a receive fiber shown optically connected to Tx jack 62b of interconnection module 16a on shelf 12. Similarly, with respect to second optic, at channel 42 from second optical cable 24, a transmit fiber is shown optically connected to Rx jack 62a (of interconnection module 18b) and a receive fiber is shown optically connected to Tx jack 62b (of interconnection module 18b). Accordingly, with respect to the cross-connections made between interconnection modules 16a and 18b, each Tx jack 64b is connected to the Rx jack 64a of the cross-connected interconnection module. That is, Rx jack 64a of interconnection module 16a is optically cross-coupled to Tx jack 64b of interconnection module 18b, and Tx jack 64b of interconnection module 16a is optically cross-coupled to Rx jack 64a of interconnection module 18b.

Therefore, in conventional operation, an optical signal that is assumed to begin from the transmit fiber of first optical channel 32 is transmitted to Rx jack 62a of interconnection module 16a, out of Tx jack 64b of interconnection module 16a, through the appropriate cross-connect fiber of jumper pair 52 to Rx jack 64a of interconnection module 18b, out of Tx jack 64b of interconnection module 18b, and to the receive fiber of second optical channel 42. From the transmit fiber of second optical channel 42, optical information is transmitted to Rx jack 62a of interconnection module 18b, out of Tx jack 64b of interconnection module 18b, through the appropriate cross-connect fiber of jumper pair 52 to Rx 64a of interconnection module 16a, out of Tx jack 62b of interconnection module 16a, and to the receive fiber of first optical channel 32.

Within conventional distribution frames, functions such as testing and monitoring often are performed manually or automatically by connecting necessary instrumentation in series between each set of optically coupled interconnection modules. In this manner, each pair of optical cross-connect jumpers is replaced by (i) a pair of optical fibers routed from the first of two interconnection modules (e.g., from second jack pair 64a–b) to the necessary testing/monitoring instrumentation and (ii) a pair of optical fibers routed from the instrumentation to the second interconnection module. In this conventional arrangement, the testing/monitoring instrumentation is installed similarly to existing interconnection modules (e.g., on shelves) near the interconnection module shelves, if sufficient space exists. However, conventional testing/monitoring instrumentation is not located wholly or partially within any of the interconnection modules.

Compared to conventional arrangements, the invention makes use of an interconnection module configuration that allows for controllers, microcontrollers and other "intelligence" or "intelligent devices" to be distributed conveniently throughout the distribution frames rather than having a plurality of passive modules in a given distribution frame routed to and from an individual testing/monitoring location. Alternatively, the inventive interconnection module configuration is used with an inventive interconnection fabric arrangement that facilitates this distributed intelligence.

For purposes of discussion in this description, the terms "intelligent devices" and "distributed intelligence" in this context are intended to encompass any active mechanical, electronic, optical and electro-optic components, including circuitry, microcontrollers and microprocessors, that contribute to those functions that are at least partially performed within the inventive interconnection module for the purpose of determining "identifiable operating characteristics". For purposes of discussion in this description, the term "identifiable operating characteristics" is intended to include the overall operability or an otherwise qualitative condition of the optical fibers, connectors and/or connections used within the optical communications system of interest. Such functions include testing, monitoring, reading, decoding, analyzing and the like.

Figure 2:
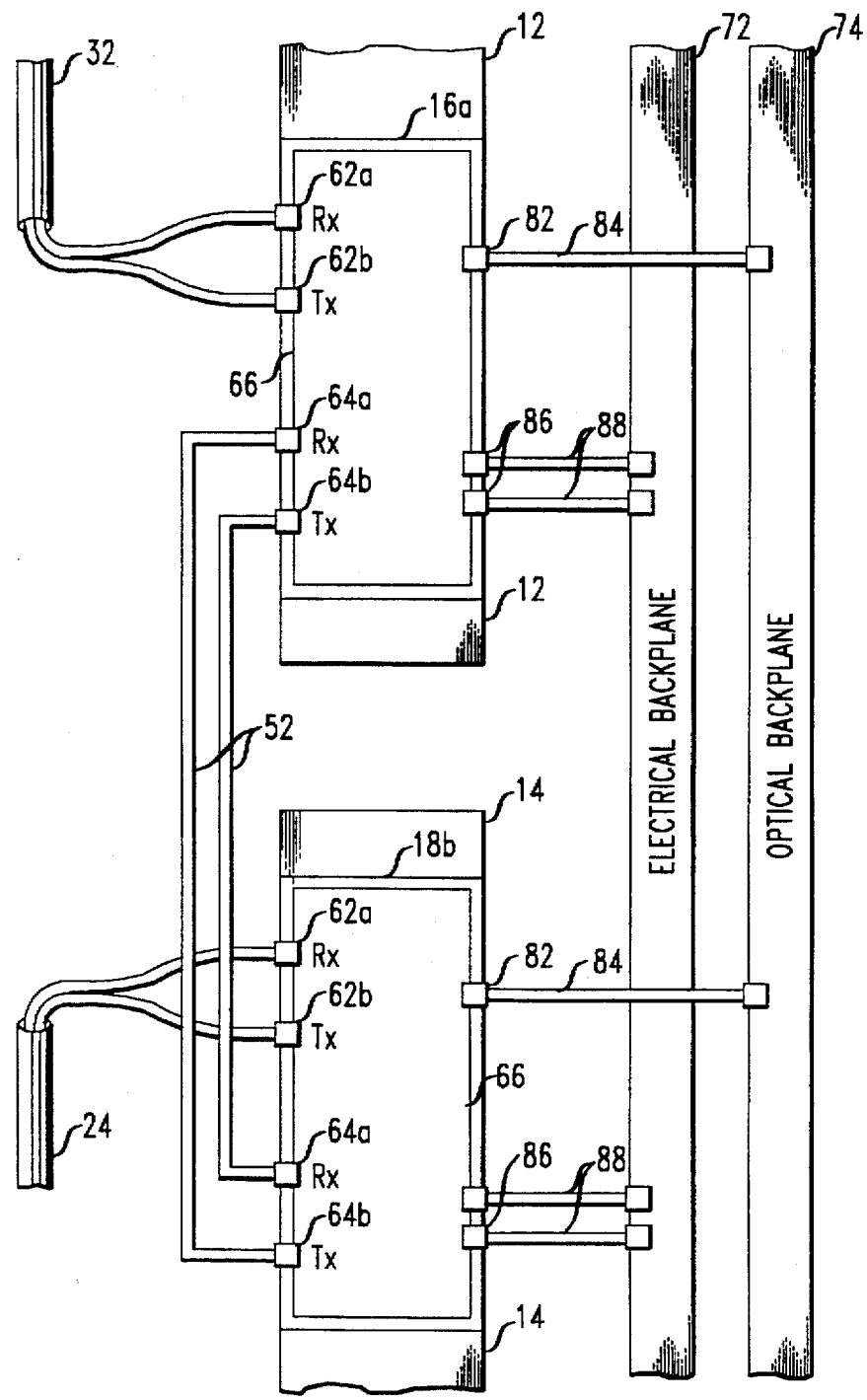
FIG. 2 is a side, schematic diagram of an illustrative portion of a distribution frame used in an optical communications system according to an embodiment of the invention.
Figure 3:
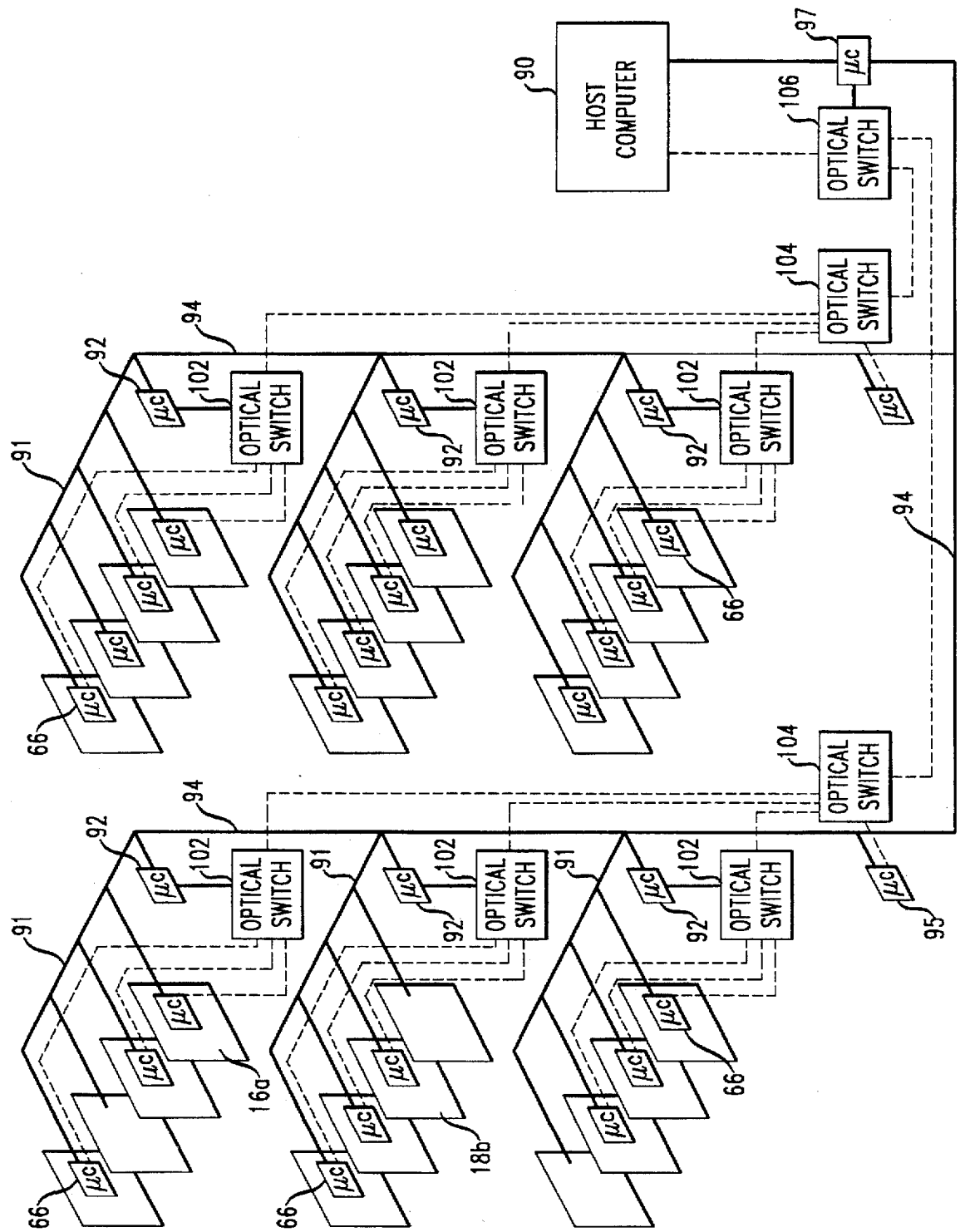
FIG. 3 is a schematic diagram of a conventional distribution frame used in an optical communications system showing the electrical and optical interconnection fabrics according to an embodiment of the invention.

As shown in FIGS. 2–3, one or more pairs of inventive interconnection modules, e.g., 16a and 18b, are installed within shelves 12, 14, respectively, of distribution frame 10 and interconnected via jumper pair 52. Inventive interconnection modules 16a, 18b include a distributed intelligence arrangement (shown generally as 66) between their first (62)

and second (64) jack pairs. The arrangement enables operable connection with an electrical interconnection fabric (shown as 72) and an optical interconnection fabric (shown as 74) in addition to the conventional optical cross-connection between optical channel 32 and optical channel 42. Interconnection modules including distributed intelligence are interchangeable with conventional interconnection modules and, except for their distributed intelligence arrangement, have conventional structure.

Interconnection modules having distributed intelligence include a front face 76 having conventional jacks for optical cross-connection. Also, the inventive interconnection modules each have a rear face 78 for operable connection to interconnection fabrics 72, 74. For example, at least one optical jack 82 is adapted for optical connection to optical interconnection fabric 74 via an optical fiber coupling 84 and at least one pair of electrical connectors 86 is adapted for electrical connection of at least the distributed intelligence portion 66 of the interconnection modules to electrical interconnection fabric 72 via wires 88.

As shown best in FIG. 3, both electrical interconnection fabric 72 and optical interconnection fabric 74 have a characteristic cascading scheme that, unlike conventional optical communications systems, substantially reduces unnecessary duplication of optical fibers routed between the distribution frames and any remote frame or system controlling equipment, e.g., a controller 90. In this inventive arrangement, interconnection modules within a shelf are adapted to be electrically coupled to a corresponding backplane arrangement or shelf controller interface (SCI) bus 91, which is electrically coupled to a corresponding shelf controller or shelf controller module (SCM) 92. Shelf controllers within a bay (e.g., a group of shelves) are electrically coupled via an interconnection bus 94 (e.g., a local area network or LAN bus) to a corresponding bay controller 95. Likewise, bay controllers are electrically coupled to controller 90 through said interconnection bus 94. Shelf controllers 92 and bay controllers 95 typically take the form of interconnection modules or backplane arrangements and thus, in actual practice, are installed, e.g., within spare locations in existing shelves.

Optical connection between interconnection modules and controller 90 is similar. A plurality of optical switches function as controllers at the shelf, bay and system levels in a similar cascading scheme. For example, each shelf has an optical switch 102 for optically coupling thereto the interconnection modules within that shelf. Also, shelf controlling optical switches 102 are optically coupled to an optical switch 104 corresponding to the bay within which the shelf is located. Each bay controlling optical switch 104 is optically coupled to a system optical switch 106 for optical connection to controller 90.

Depending on the optical system arrangement, controller 90 is a frame controller providing a gateway between interconnection bus 94 and the next higher network level. For example, controller 90 is a system controller for distribution frame 10 and is operably connected to a client server (not shown) that, in a conventional arrangement, is operably connected to other system controllers within an optical communications network. That is, system controller 90 is a network gateway outside of the plant in which distribution frame 10 resides.

Figure 4:
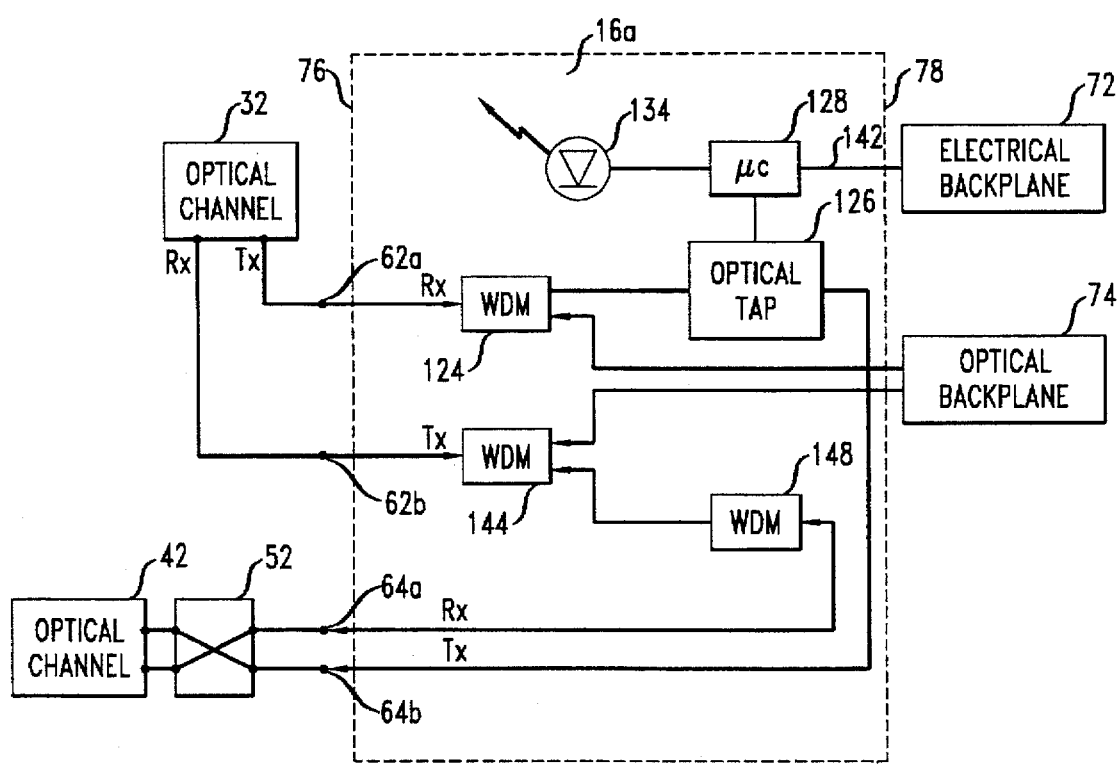
FIG. 4 is a schematic diagram of an interconnection module according to an embodiment of the invention.

Referring now to FIG. 4, an interconnection module according to an embodiment of the invention is shown. Inventive interconnection module 16a has a plurality of input jacks 62a, 62b, 64a, 64b on front face 76 that are consistent with the input jacks of conventional interconnection modules, thus contributing to the interchangeability of interconnection module 16a with conventional interconnection modules. Such interchangeability is a significant feature of the inventive interconnection module.

Interconnection module 16a has a first wavelength division multiplexer (WDM) 124 with an input optically coupled to Rx jack 62a and an output optically coupled to an optical tap 126. One output of optical tap 126 is optically coupled to Tx jack 64b and the other output is coupled to a microcontroller 128 or other suitable device for interpreting the information collected by optical tap 126. For example, microcontroller 128 may have a light detecting component such as a photodiode (not shown) that converts the light coupled from optical tap 126 to an electrical signal used internally by microcontroller 128 or by an external passive device such as an LED 134 coupled to microcontroller 128. Alternatively, microcontroller 128 may have receiving components capable of interpreting the optical information coupled from optical tap 126. Also, microcontroller 128 is electrically connected to electrical interconnection fabric 72 via an electrical coupling 142.

Tx jack 62b is optically coupled to the output of a second WDM 144 (the primary direction of optical transmission is depicted in FIG. 4 by arrows). The first of two inputs of second WDM 144 is optically coupled to optical interconnection fabric 74 and the second input is optically coupled to the output of a third WDM 148. The input of third WDM 148 is optically coupled to Rx jack 64a. Alternatively, WDM 144 and/or WDM 148 are suitable for an optical tap (not shown) to be coupled therewith.

In operation, an optical signal transmitted from first optical channel 32 is received by interconnection module 16a via Rx jack 62a. The optical signal is optically coupled to Tx jack 64b through first WDM 124 and optical tap 126. First WDM 124 separates portions of the incoming optical signal, e.g., based on frequency, and transmits the desired components to optical tap 126. Optical tap 126 deflects a small portion of the optical signal to microcontroller 128 for monitoring, testing and/or other analysis. The remaining portion of the optical signal is transmitted to Tx jack 64b for subsequent optical coupling to the Rx jack (i.e., Rx jack 64a) of a cross-connected interconnection module (i.e., interconnection module 18b).

Microcontroller 128 is capable of continuously monitoring the content and/or strength of the optical signal it receives from optical tap 126 to determine if an appropriate action needs to be performed. Also, because microcontroller 128 is electrically connected via electrical interconnection fabric 72 to system controller 90, electrical information can be transmitted therebetween as needed.

For example, if microcontroller 128 determines that the strength of the optical signal it receives from optical tap 126 is questionable, such information can be sent to system controller 90 for necessary processing. In response thereto, for example, system controller 90 controls transmission of the appropriate optical test signals through optical interconnection fabric 74 and WDMs 142 and 144 to Rx jack 62a and/or Tx jack 62b of the interconnection module that originally sent the information. Such test signals include, e.g., optical time domain reflectometry (OTDR) test signals in accordance with conventional OTDR principles. In this manner, the integrity of first optical channel 32 and jacks 62a, 62b are tested continuously and automatically.

Because microcontroller 128 is an actively intelligent device, it can be configured to include addressable functions.

Thus, microcontroller 128 is suitable for transmitting electrical information containing address information identifying the source of the information (i.e., the interconnection module from which the information was transmitted). Also, although an optical signal strength testing operation is described above, it is within the scope of the invention for microcontroller 128 to analyze the content of tapped optical information and to communicate with system controller 90 accordingly. In this manner, microcontroller 128 is capable of incorporating control information, monitoring statistic information and other content-based information initiated by microcontroller into the electrical information transmitted to system controller 90 or other interconnection modules.

The actively intelligent and self-aware nature of the inventive interconnection modules allows them to be installed within existing distribution flames and to become part of the overall optical communications system. For example, a newly installed interconnection module is capable of transmitting its identity, module type and other characteristic information to system controller 90 and to other interconnection modules within the optical communications system via electrical interconnection fabric 72. Therefore, the overall configuration of the optical communications system is capable of being updated automatically upon installation of an inventive interconnection module therein.

Furthermore, it is within the scope of the invention for the distributed intelligence to cause an interconnection module to shifting into a local operating mode or a self-diagnostic mode in the event of a network emergency. The results of such actions include, for example, self healing in the form of rerouting the optical connections of the interconnection module in question. Also, continued operation in the event of power failure is possible through local operating modes.

Microcontroller 128 is capable of including therewith other sensing and/or testing equipment, and is capable of incorporating information in addition to that transmitted via Rx jack 62a. For example, microcontroller 128 can include or be replaced by a sensor that determines the temperature and/or quality of the air surrounding interconnection module 16a. Such information can be used in monitoring and/or testing functions. Also, microcontroller 128 is capable of being configured to analyze previous monitoring information and to perform statistical performance monitoring based on such information. In this manner, the interconnection modules are actively performing failure prediction functions instead of passively reacting to an established threshold condition.

Other functions adaptable for use by microcontroller 128 in this regard include fiber tracing, protection line switching, monitoring the surrounding environment. All of these functions, as well as those discussed herein previously, are capable of performance in both single mode and multi-mode optical fiber.

As discussed previously, the characteristically branched electrical and optical interconnection fabrics 72, 74 allow the distribution frames within an optical communications system to be monitored automatically. Also, the distributed intelligence allows most if not all of the monitoring, processing and the like to be performed locally (i.e., at the interconnection modules) through massive or distributed parallel processing, rather than passively transmitting the information from the interconnection modules to a remotely located system controller.

For example, assuming interconnection module 16a is optically connected to the first optical channel and cross-connected with interconnection module 18b, which is assumed to be optically connected to the second optical channel, the distributed intelligence installed in each interconnection module is used to monitor the operation and maintenance of that optical communication channel. First, several if not all SCMs 92 electrically polls, in real time, the interconnection modules within its respective shelf for any information such as monitoring status. This simultaneous polling epitomizes the distributed or massive parallel processing effort of the invention. Unlike, conventional systems (which use one shared polling device to obtain information serially on a fiber by fiber basis, resulting in non-real-time results and long duty cycles), the distributed intelligence does not require polling type sharing and thus does not affect the responsiveness of the system. Thus, communication systems using massive parallel processing techniques are not limited by the number of optical fiber channels operating therein.

In the event an SCM receives a positive status report from an interconnection module (i.e., a flagged event has occurred at the interconnection module), information concerning the flagged event, the interconnection module originating the flagged event and any control information for responding appropriately to the flagged event is transmitted from the respective SCM to system controller 90. Once the information has been received, appropriate information or test signals can be transmitted from system controller 90 to the interconnection module from which the information was received. Alternatively, information and/or test signals can be transmitted to the interconnection module that is cross-connected to the interconnection module from which the flagged event information was sent. In this manner, the entire optical communications system is monitored simultaneously and tested automatically when necessary or requested.

It will be apparent to those skilled in the art that many changes and substitutions can be made to the optical fiber communications system herein described without departing from the spirit and scope of the invention as defined by the appended claims and their full scope of equivalents.

What is claimed is:

1. An optical communications system having a distribution frame, said communications system for use with a system controller associated with said distribution frame, said distribution frame comprising:
   at least one shelf;
   at least one interconnection module operably connected within said at least one shelf and adapted for optically connecting a first optical channel to a second optical channel,
   wherein each of said interconnection modules is adapted to include a microcontroller capable of ascertaining at least one identifiable operating characteristic associated with said optical communications system; and
   an electrical interconnection fabric for electrically connecting said interconnection modules including a microcontroller with said system controller and with other interconnection modules.

2. The system as recited in claim 1, wherein said system further comprises an optical interconnection fabric for optically connecting each of said interconnection modules including a microcontroller with said system controller.

3. The system as recited in claim 1, wherein said electrical interconnection fabric controls electrical information transmitted between said interconnection module microcontrollers within said system and between said microcontrollers and said system controller, said electrical information including information associated with the optical information transmitted between said first and second optical channels and wherein said system further comprises:

an optical interconnection fabric for controlling optical information transmitted between said system controller and said interconnection module microcontrollers, said optical information including information associated with the optical information transmitted between said first and second optical channels.

4. The system as recited in claim 1, wherein said interconnection module is adapted for monitoring the transmission of the optical information between said first and second optical channels and for operably connecting to said microcontroller.

5. The system as recited in claim 1, wherein said interconnection module includes an optical tapping arrangement operably connected between said first and second optical channels for detecting the signal strength of optical information transmitted between said first and second optical channels.

6. The system as recited in claim 1, wherein said interconnection module includes circuitry for monitoring the signal strength of the optical information transmitted between said first and second optical channels and for transmitting information based on said monitored signal strength.

7. The system as recited in claim 1, wherein said communications system is in electrical and optical connection with said system controller in such a way that said microcontroller can transmit an electrical signal to said system controller that causes an optical signal to be transmitted in response thereto from said system controller to the interconnection module from which said electrical signal was transmitted.

8. The system as recited in claim 1, wherein said at least one interconnection module further comprises a first interconnection module optically connected to said first optical channel and a second interconnection module optically connected to said second optical channel, and wherein said communications system further comprises an optical jumper cable optically connected between said first and second interconnection modules.

9. An optical communications system having a distribution frame, said distribution frame comprising:

a plurality of shelves;

at least one interconnection module operably connected within said plurality of shelves and adapted for optically connecting a first optical channel to a second optical channel, wherein said interconnection module is adapted to include a microcontroller capable of monitoring the transmission of optical information between said first and second optical channels; and an interconnection bus adapted to operably connect said interconnection modules with each other and with a system controller, said interconnection bus including at least one controller for controlling the transmission of electric, at information associated with said optical communications system between said interconnection modules and between said interconnection modules and said system controller.

10. The system as recited in claim 9, wherein said plurality of shelves comprise at least one bay, and wherein said at least one controller further comprises a shelf controller corresponding to each of said shelves and a bay controller corresponding to said at least one bay, said shelf controllers being in electrical connection with the interconnection modules in their respective shelf, said bay controller being in electrical connection between said shelf controllers in the corresponding bay and said interconnection bus.

11. The system as recited in claim 9, wherein said plurality of shelves has associated therewith at least one shelf controller adapted for polling the monitoring status of the interconnection modules associated therewith.

12. The system as recited in claim 9, wherein each of said interconnection modules has an address associated therewith and capable of being read by other interconnection modules and controllers via said interconnection bus.

13. The system as recited in claim 9, wherein said interconnection module is adapted to operable connect said first optical channel to said second optical channel in a way such that said interconnection module is not operably connected to said interconnection bus.

14. The system as recited in claim 9, further comprising an optical interconnection fabric optically connecting said interconnection modules having a microcontroller with each other and with said system controller.

15. The system as recited in claim 14, wherein said plurality of shelves comprises at least one bay, and wherein said optical interconnection fabric is arranged so that said plurality of optical switches further comprises a shelf controlling optical switch associated with each of said plurality of shelves and a bay controlling optical switch corresponding to each of said bays, said shelf controlling optical switches being in optical connection between said interconnection modules having a microcontroller in the corresponding shelf and said bay controlling optical switch, said bay controlling optical switch being in optical connection between said shelf controlling optical switches in the corresponding bay and said system controller.

16. The system as recited in claim 14, wherein said optical interconnection fabric is arranged in such a way that said system controller transmits optical test signals through said first and second optical channels in response to at least one of said interconnection modules detecting disruptions in the signal strength of said optical information transmitted between said first and second optical channels.

17. The system as recited in claim 9, wherein each of said interconnection modules including a microcontroller monitors the signal strength of optical information transmitted between said first and second channels, and wherein said microcontroller transmits electrical information associated with said optical information signal strength through said electrical interconnection fabric to said system controller.

* * * * *